(12) United States Patent
Medina

(10) Patent No.: US 11,390,376 B2
(45) Date of Patent: Jul. 19, 2022

(54) TRIM CONTROL SYSTEM

(71) Applicant: Goodrich Actuation Systems SAS, Saint-Ouen-l'Aumone (FR)

(72) Inventor: Raphael Medina, Saint-Ouen-l'Aumone (FR)

(73) Assignee: GOODRICH ACTUATION SYSTEMS SAS, Saint-Ouen l'Aumône (FR)

( * ) Notice: Subject to any disclaimer, the term of this patent is extended or adjusted under 35 U.S.C. 154(b) by 268 days.

(21) Appl. No.: 16/665,152

(22) Filed: Oct. 28, 2019

(65) Prior Publication Data

US 2020/0148334 A1 May 14, 2020

(30) Foreign Application Priority Data

Nov. 12, 2018 (EP) .................................... 18306477

(51) Int. Cl.
| | |
|---|---|
| *B64C 13/50* | (2006.01) |
| *B64C 5/10* | (2006.01) |
| *B64C 9/02* | (2006.01) |
| *B64C 13/04* | (2006.01) |
| *B64C 13/22* | (2006.01) |
| *B64F 5/00* | (2017.01) |

(52) U.S. Cl.
CPC .............. *B64C 13/503* (2013.01); *B64C 5/10* (2013.01); *B64C 9/02* (2013.01); *B64C 13/04* (2013.01); *B64C 13/22* (2013.01); *B64F 5/00* (2013.01)

(58) Field of Classification Search
CPC .......................... B64C 13/503; B64C 13/0427
See application file for complete search history.

(56) References Cited

U.S. PATENT DOCUMENTS

| | | | |
|---|---|---|---|
| 4,759,515 A | 7/1988 | Udo | |
| 6,241,182 B1 | 6/2001 | Durandeau et al. | |
| 6,439,512 B1 * | 8/2002 | Hart ...................... | B64C 13/505 |
| | | | 244/178 |
| 6,446,911 B1 * | 9/2002 | Yount .................. | G05D 1/0077 |
| | | | 244/195 |

(Continued)

FOREIGN PATENT DOCUMENTS

| | | | | |
|---|---|---|---|---|
| CA | 3021492 A1 * | 6/2019 | ............ | B64C 13/04 |
| WO | 9503212 A1 | 2/1995 | | |

OTHER PUBLICATIONS

Extended European Search Report for International Application No. 18306477.3 dated May 23, 2019, 9 pages.

*Primary Examiner* — Philip J Bonzell
*Assistant Examiner* — Michael B. Kreiner
(74) *Attorney, Agent, or Firm* — Cantor Colburn LLP

(57) ABSTRACT

A trimmable horizontal stabiliser actuator (THSA) control system includes least one main THSA motor for driving the THSA in response to inputs from a flight control computer (FCC), a pilot trim control system for manual control of the THSA by a pilot overriding the FCC. The pilot trim control system comprises a trim control for receiving an input from the pilot, the trim control including a trim control sensor for detecting the input from the pilot and providing a pilot trim control signal; a THSA trim control motor for driving the THSA in response to the pilot trim control signal; and an electronic override system for giving inputs from the pilot priority over inputs from the FCC.

11 Claims, 3 Drawing Sheets

(56) References Cited

U.S. PATENT DOCUMENTS

| | | | |
|---|---|---|---|
| 6,561,463 B1* | 5/2003 | Yount | B64C 9/12 |
| | | | 244/221 |
| 8,740,155 B2 | 6/2014 | Fervel et al. | |
| 9,533,751 B2 | 1/2017 | Lin et al. | |
| 2003/0127569 A1* | 7/2003 | Bacon | B64C 13/505 |
| | | | 244/195 |
| 2009/0012657 A1* | 1/2009 | Knotts | G05D 1/0038 |
| | | | 701/3 |
| 2009/0222148 A1* | 9/2009 | Knotts | G05D 1/0038 |
| | | | 701/2 |
| 2011/0251739 A1* | 10/2011 | Tomas | G05D 1/0077 |
| | | | 701/3 |
| 2012/0290153 A1* | 11/2012 | Olsoe | B64C 13/505 |
| | | | 701/3 |
| 2013/0168501 A1* | 7/2013 | Chaduc | B64C 27/68 |
| | | | 244/227 |
| 2016/0046364 A1* | 2/2016 | Buethe | B64C 13/503 |
| | | | 244/228 |
| 2017/0335931 A1* | 11/2017 | Moulon | F16H 25/24 |
| 2018/0086430 A1* | 3/2018 | Beaufrere | B64C 5/02 |
| 2018/0339764 A1* | 11/2018 | Currivan | B64C 27/04 |
| 2019/0202545 A1* | 7/2019 | Medina | B64C 13/503 |

\* cited by examiner

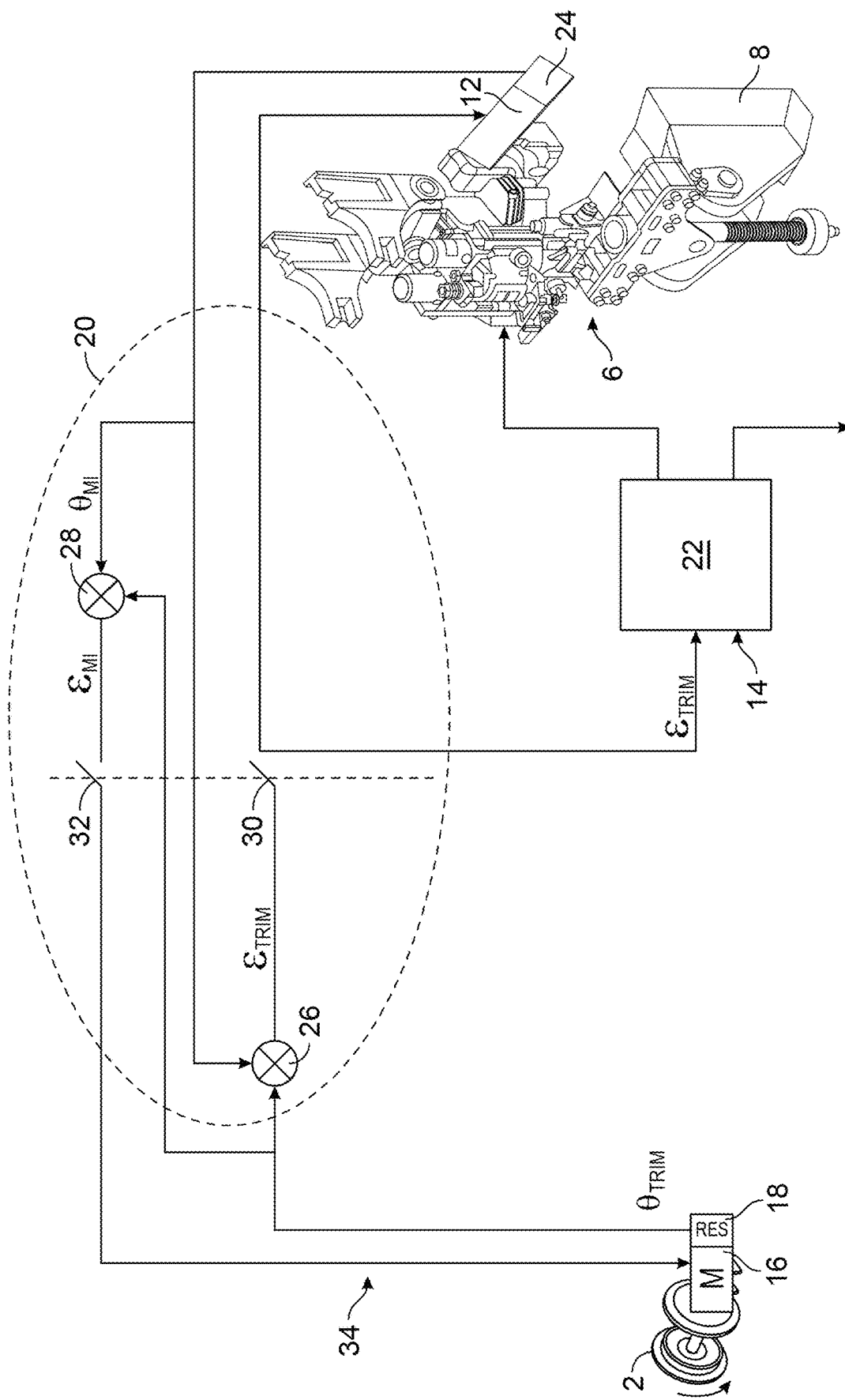

TRIM CONTROL SYSTEM

FOREIGN PRIORITY

This application claims priority to European Patent Application No. 18306477.3 filed Nov. 12, 2018, the entire contents of which is incorporated herein by reference.

TECHNICAL FIELD

The invention relates to a trimmable horizontal stabiliser actuator (THSA) control system for an aircraft as well as a method for control of a THSA of an aircraft. The THSA control system may be installed during manufacture of an aircraft or retrofitted to replace an existing THSA control system.

BACKGROUND

It is known for an aircraft to include various ways to control a THSA. Typically a flight control computer (FCC) will be able to drive movement of the THSA via several electrical motors, with multiple motors being provided for redundancy purposes. This allows for computer controlled movement of the THSA during flight. The movement of the electric motors drives an hydraulic valve block which will control the speed of hydraulic motor(s) that actuate the stabiliser. The hydraulic motor(s) will provide movement of the THSA. In some aircraft types the pilot is provided with a mechanical trim control in the cockpit as a back-up function as well as for manual control of the trim angle, for example during take-off. This mechanical trim control is generally a trim control wheel. It permits pilot inputs to override the FCC control of the THSA, for example to set a required trim angle during take-off or to take control if there is a total failure of the FCC. An example is shown in FIG. 1. In this arrangement the trim control wheel 2 operates mechanically through the use of control cables 4 extending from the cockpit to the THSA 6. When the pilot operates the trim control wheel 2, the FCC-controlled electric motors are de-clutched and the THSA 6 is driven via the control cables 4 to move the stabilizer 8. The control cables 4 are always coupled to the THSA 6 such that when there is no pilot input via the trim control wheel 2 and the FCC motors are not de-clutched then movement of the THSA 6 gives rise to a corresponding movement of the trim control wheel 2.

SUMMARY

Viewed from a first aspect, the invention provides a trimmable horizontal stabiliser actuator (THSA) control system for an aircraft, the THSA control system including: at least one main THSA motor for driving the THSA in response to inputs from a flight control computer (FCC); a pilot trim control system for manual control of the THSA by a pilot overriding the FCC, wherein the pilot trim control system comprises a trim control for receiving an input from the pilot, the trim control including a trim control sensor for detecting the input from the pilot and providing a pilot trim control signal; a THSA trim control motor for driving the THSA in response to the pilot trim control signal; and an electronic override system for giving inputs from the pilot priority over inputs from the FCC by preventing the at least one main THSA motor from driving the THSA when an input from the pilot via the pilot trim control system requires a different state for the THSA than an input from the FCC.

With this arrangement it becomes possible to replace mechanical pilot trim control systems of the type discussed above with an electronic trim control system. This can be lighter, cheaper to manufacture and install, and also easier to maintain when in service. Via the electronic override, the pilot has priority over the FCC and the main THSA motor(s) (that are controlled by the FCC in normal operation of the aircraft), which are prevented from driving the THSA. This may be considered as a kind of electronic clutch arrangement. Whilst the main THSA motor(s) are prevented from driving the THSA, the THSA will be driven by the THSA trim control motor in response to inputs from the pilot to the trim control. When the pilot has not provided any trim control input then the THSA is permitted to be driven by the at least one main THSA motor in line with the inputs from the FCC. In this way the proposed system operates in a similar way to existing pilot trim controls, which allows pilots who are familiar with an old-style mechanically controlled trim to easily operate the proposed electrically controlled trim.

It will be appreciated that the THSA trim control motor is provided in addition to the at least one main THSA motor and may have the sole purpose of enabling pilot trim control for the THSA. Thus, there may be no possibility for the THSA trim control motor to be controlled by the FCC. The THSA trim control motor may be provided in addition to multiple main THSA motors (e.g. a plurality of main THSA motors provided for redundancy) and/or in addition to one or more THSA motors or other actuator driving systems provided for back-up control of the THSA during flight, such as back-up control in response to failure of the main motor(s) and/or electrical failures impairing operation of the FCC. In current aircraft, there are typically three THSA electric motor controls connected to the FCC. With the use of the control system of the first aspect of the invention, one of the three electric motors connected to the FCC may be replaced by the THSA trim control motor connected to the trim control.

As is known for THSA control systems the trim control motor typically drives the THSA via an hydraulic actuator of the THSA. The at least one main THSA motor may drive the THSA in the same manner. The control system discussed herein may be used with any suitable known designs of THSA devices with the THSA trim control motor driving the THSA in the same way as existing FCC-controlled motors of such known THSA devices.

The trim control for receiving the input from the pilot may be a mechanical device such as a trim control wheel. Once again this allows for easy operation of the proposed system by pilots used to existing mechanical systems. In addition it allows for existing cockpit components to be easily adapted or replaced. In one example the trim control comprises a trim control wheel and the trim control sensor is for measuring the position of the trim control wheel. Such a trim control may be produced by addition of a suitable trim control sensor, such as a resolver, to an existing trim control wheel.

The trim control may be arranged to receive an indication of THSA movements driven by input from the FCC and to provide feedback on such THSA movements to the pilot. For example, in the case of a mechanical trim control such as a trim control wheel the trim control may move to reflect THSA movements driven by input from the FCC. Thus, by visual inspection of the trim control the pilot can determine the current THSA position. Once again this mirrors the operation of known mechanical systems. In one possible implementation the trim control includes a trim feedback motor for moving the trim control based on the indication of THSA movements driven by input from the FCC. The indication of THSA movements may be based on the output of a trim feedback sensor at the THSA, such as a resolver.

The electronic override system may be provided as a part of an electronic control circuit. Thus, the electronic control circuit may be configured to give inputs from the pilot priority over inputs from the FCC by preventing the at least one main THSA motor from driving the THSA when an input from the pilot via the pilot trim control system requires a different state for the THSA than an input from the FCC. The electronic control circuit may include a trim control comparator for comparing a current trim angle of the THSA (for example from a trim feedback sensor) with a trim angle demanded by the pilot trim control signal, wherein when the pilot input at the trim control results in a difference between demanded trim angle and the actual trim angle, the electronic circuit prevents driving of the THSA by the at least one main THSA motor, whilst the THSA is driven by the trim control motor in accordance with the pilot input. The electronic control circuit may include a trim control switch that is closed when the trim control comparator identifies a difference in reaction to the pilot input, wherein the trim control switch deactivates driving of the THSA by the at least one main THSA motor, whilst also directing a trim control signal to the trim control motor in order that the THSA is driven by the trim control motor.

In the case where the trim control provides feedback to the pilot on THSA movements driven by input from the FCC then the electronic control circuit may include a trim feedback comparator for comparing a trim angle of the THSA with the position of the trim control, wherein when the FCC input results in movement of the THSA to an angle that is inconsistent with the position of the trim control, a trim feedback signal is sent to the trim control. The trim feedback signal may control the trim feedback motor to move the trim control. The electronic control circuit may comprise a trim feedback switch that is closed when the trim feedback comparator identifies a difference resulting from movement of the THSA under FCC control.

The electronic control circuit may be arranged such that if the trim feedback switch is closed and the pilot makes an input to the trim control then the trim feedback switch will be opened.

It will be appreciated that the THSA control system is intended to be installed on an aircraft in conjunction with a THSA and thus the invention extends to a THSA combined with the THSA control system of the first aspect, and optionally including one or more of the other features discussed above. In other aspects the invention provides an aircraft incorporating the THSA control system of the first aspect and optionally including any of the other features discussed above. The aircraft may be arranged with the pilot trim control system in a cockpit of the aircraft, a THSA connected with a trimmable horizontal stabiliser for actuation thereof, the at least one main THSA motor connected to the THSA for driving the THSA and the THSA trim control motor also connected to the THSA for driving the THSA. The at least one main THSA motor and the THSA trim control motor may be installed adjacent one another.

Viewed from a yet further aspect the invention provides a method for control of a THSA of an aircraft, the method comprising: driving the THSA when required in response to inputs from a flight control computer (FCC) via at least one main THSA motor; using a pilot trim control system for manual control of the THSA by a pilot overriding the FCC, wherein the pilot trim control system comprises a trim control for receiving an input from the pilot, the trim control including a trim control sensor for detecting the input from the pilot and providing a pilot trim control signal; driving the THSA in response to the pilot trim control signal via a THSA trim control motor; and giving inputs from the pilot priority over inputs from the FCC by using an electronic override system to prevent the at least one main THSA motor from driving the THSA when an input from the pilot via the pilot trim control system requires a different state for the THSA than an input from the FCC.

The method may make use of a THSA control system as discussed above. Thus, the method may include the control system operating in a similar way to existing pilot trim controls. The THSA motor may drive the THSA via a hydraulic actuator of the THSA.

The trim control sensor is used to detect the input from the pilot, for example by detecting the position of a mechanical trim control such as a trim control wheel.

The method may comprise providing feedback on THSA movements to the pilot, for example by the trim control receiving an indication of THSA movements driven by input from the FCC and the trim control providing feedback on such THSA movements to the pilot. In one example the method comprises moving the trim control to reflect THSA movements that are driven by input from the FCC.

In a yet further aspect the invention extends to a method of modifying an aircraft to replace a pre-existing mechanical THSA control system with the THSA control system of the first aspect; wherein the pre-existing mechanical THSA control system comprises a trim control, a mechanical input for the THSA and control cables coupling the trim control to the mechanical input for the THSA; wherein the method comprises: removing and/or disconnecting the control cables; installing the trim control sensor at the trim control; and replacing the mechanical input for the THSA with the trim control motor. This method may include providing the THSA control system with further features as discussed above, for example using an electronic control circuit, providing a trim feedback motor at the trim control, and/or providing a trim feedback sensor at the THSA.

BRIEF DESCRIPTION OF THE DRAWINGS

A non-limiting embodiment of the invention will now be described by way of example only and with reference to the accompanying drawings, in which:

FIG. 3 shows an electronic override and trim feedback system for use with a trim control system of the type shown in FIG. 2.

DETAILED DESCRIPTION

Figure 1:
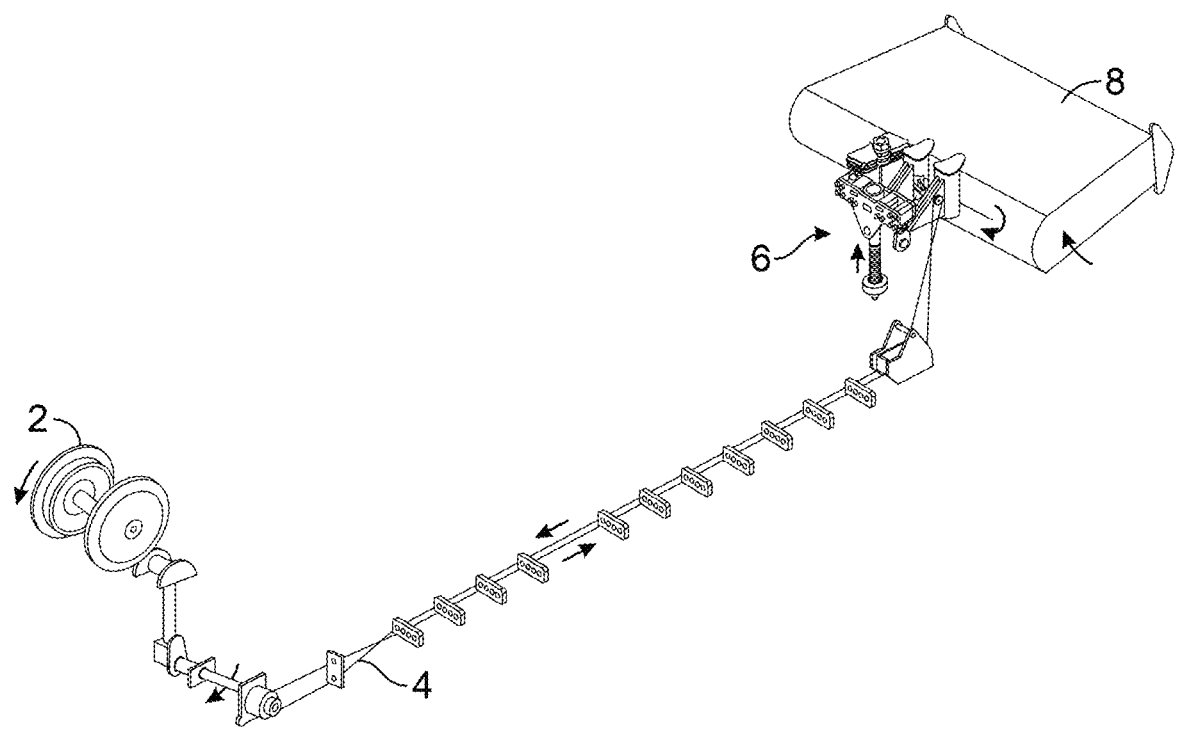
FIG. 1 shows a prior art mechanical trim control system.
Figure 2:
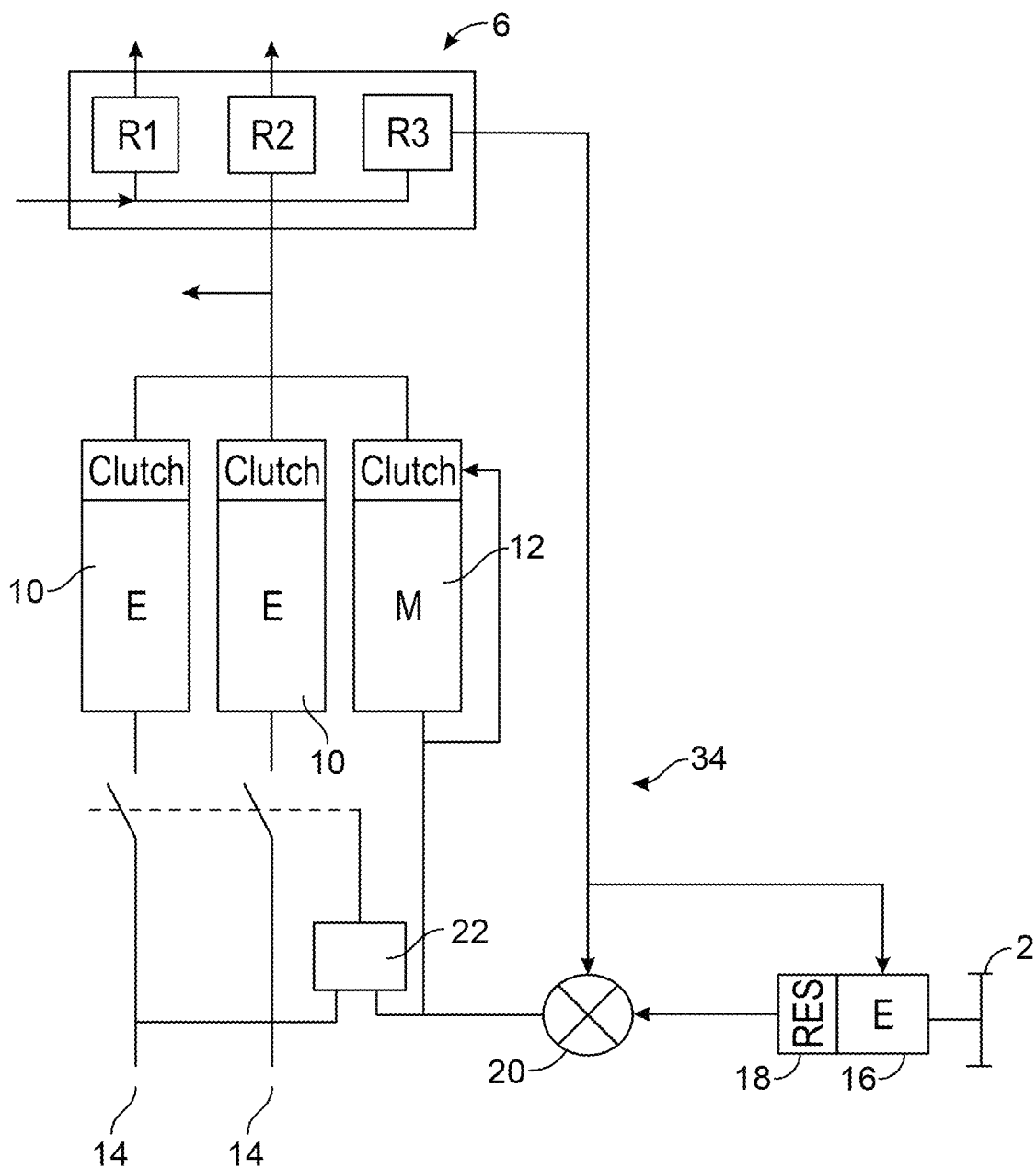
FIG. 2 is a schematic diagram of a proposed electrical trim control system.

In the example embodiments the mechanical trim control system of FIG. 1 is replaced with an electrical trim control system, which may result in a THSA control system as shown in FIG. 2. The THSA control system of FIG. 2 includes two main THSA motors 10 along with a trim control motor 12, each of which is capable of driving movement of the THSA 6 using any suitable THSA arrangement for hydraulic actuation of the stabilizer driven by movement of one of the motors 10, 12. The main THSA motors 10 can receive inputs 14 from the flight control computer (FCC) of the aircraft and this allows for FCC controlled movement of the THSA, for example during flight.

A trim wheel 2 is provided for manual input by the pilot, and this trim wheel 2 has a sensor 18 in the form of a resolver. The trim wheel 2 is also provided with a trim feedback motor 16 for drive-back movement of the trim wheel 2 to follow movements of the THSA 6 that are made based on FCC inputs 14, i.e. when the pilot is not providing an input to the trim wheel 2. If the pilot chooses to operate the trim wheel 2 then inputs by the pilot are detected via the sensor 18, which prompts an electrical override system 22 within an electronic control circuit 34 to prevent movement of the THSA 6 via the main THSA motors 10, whilst the THSA 6 is then driven by the trim control motor 12. Thus, the prior art mechanical control wires and the prior art mechanical drive of the THSA 6 are replaced by an electrical system, which is lighter and requires minimal maintenance.

The electrical override system 22 can be implemented in any suitable fashion and forms part of an electronic control circuit 34 as noted above. In the example of FIG. 2 the electrical override system 22 is coupled to a comparator arrangement 20 for comparing the sensed position of the trim wheel 2 with a sensed position of the THSA 6, for example via a trim feedback sensor 24 at the THSA 6 as shown in FIG. 3, and for prompting disconnection of the main THSA motors 10 when the pilot input at the trim wheel 2 demands a different angle for the THSA 6 than the current angle. This then permits the THSA 6 to be driven by the trim control motor 10, based on the output from the comparator arrangement 20, without any conflict arising from the FCC inputs 14.

FIG. 3 shows a more detailed example for the architecture of the electronic control circuit 34 for the proposed electrical trim control system. As with FIG. 2 the trim wheel 2 has a trim control sensor 18 and a trim feedback motor 16. Also as in FIG. 2 the THSA 6 can be driven by the trim control motor 12, which as noted above has a trim feedback sensor 24 for indicating the position of the THSA 6. In the example of FIG. 3 the comparator arrangement 20 includes a trim control comparator 26 and a trim feedback comparator 28. The trim control comparator 26 controls a trim control switch 30 and the trim feedback comparator 28 controls a trim feedback switch 32.

The trim feedback comparator 26 receives a first signal $\theta_{TRIM}$ from the trim control sensor 18. This signal $\theta_{TRIM}$ represents the trim angle demanded by the trim wheel 2 and hence provides the pilot trim control signal $\theta_{TRIM}$ in the event of a trim adjustment required by pilot input. The trim control comparator 26 also receives a second signal $\theta_{MI}$ from the trim feedback sensor 24, with this hence being a trim feedback signal $\theta_{MI}$ indicative of the current trim angle of the stabilizer 8. If there is a pilot input at the trim wheel 2 such that there is a change in the pilot trim control signal $\theta_{TRIM}$ resulting in a difference between the pilot trim control signal $\theta_{TRIM}$ and the trim feedback signal $\theta_{MI}$ then the trim control comparator 26 closes the trim control switch 30, which then triggers the prevention of control of the THSA 6 by the main THSA motors 10 via the electronic override 22. Simultaneous control of the THSA 6 by the trim control motor 12 occurs in accordance with the trim control comparator 26 output $\varepsilon_{TRIM}$, which may be based on the difference between the trim control signal $\theta_{TRIM}$ and the trim feedback signal $\theta_{MI}$, along with some suitable control logic. When the pilot input ceases, i.e. when the two signals ($\theta_{TRIM}$, $\theta_{MI}$) remain the same, then the trim control switch 30 can be opened. Thus, at any point where there is movement of the trim wheel 2 by the pilot that demands a trim angle different to that set by the FCC then the pilot input takes priority and overrides FCC inputs 14.

In order that the pilot can see an indication of the current trim angle then the THSA control system also includes a feedback arrangement making use of the trim feedback motor 16 to turn the trim wheel 2 when the FCC inputs 14 result in changes to the trim angle. Thus, the trim feedback comparator 28 receives the trim feedback signal $\theta_{MI}$ from the trim feedback sensor 24 and compares it with the trim control signal $\theta_{TRIM}$ from the trim control sensor 18. If a change in the trim feedback signal $\theta_{MI}$ results in a difference between the pilot trim control signal $\theta_{TRIM}$ and the trim feedback signal $\theta_{MI}$ then the trim feedback comparator 28 closes the trim feedback switch 32 and outputs a trim feedback comparator output $\varepsilon_{MI}$ allowing for control of the trim wheel 2 via the trim feedback motor 16.

In order that there is no conflict between the trim feedback and the pilot trim control then the system is arranged such that when the trim control comparator 26 detects a change in the trim wheel 2 position then the trim feedback switch 32 is opened to disconnect the trim feedback comparator output $\varepsilon_{MI}$ from the trim feedback motor 16 and all free movement of the trim wheel 2 by the pilot.

It will be understood that the proposed THSA control system can be provided as originally installed equipment on an aircraft, or it may be retrofitted to replace an existing THSA control system, such as by replacing a mechanical system as in FIG. 1 in order to upgrade the aircraft. Compared to the mechanical system of FIG. 1, the electrical trim control system of FIGS. 2 and 3 requires that the control cables 4 are disconnected and ideally also removed and that modified or replacement parts are used for the trim wheel 2 and for the input to the THSA 6. The trim wheel 2 of FIGS. 2 and 3 differs from the trim wheel 2 of FIG. 1 in that it has been provided with a trim control sensor 18 and a trim feedback motor 16. In the case of a retrofitted installation the existing trim control wheel 2 may be modified by addition of a suitable sensor (e.g. a resolver) and a motor. The input for the THSA 6 is a mechanical input in FIG. 1 and this is replaced by the trim control motor 12 in accordance with the arrangement of FIG. 2/FIG. 3. The trim control motor 12 may substitute for a motor previously used for redundancy in FCC control. For example some aircraft designs include three electric motors for the THSA 6 and the proposed trim control system may take one of these motors to be the trim control motor 12 with the other two remaining as the main THSA motors 10. Alternatively an extra motor may be added. With a retrofitted arrangement or originally installed equipment then the new motors and sensors are connected with an electronic override system within an electronic control circuit as described above.

The invention claimed is:

1. A trimmable horizontal stabiliser actuator (THSA) control system for an aircraft, the THSA control system comprising:
   at least one main THSA motor for driving the THSA in response to inputs from a flight control computer (FCC);
   a pilot trim control system for manual control of the THSA by a pilot overriding the FCC, wherein the pilot trim control system comprises a trim control for receiving an input from the pilot, the trim control including a trim control sensor for detecting the input from the pilot and providing a pilot trim control signal;
   a THSA trim control motor for driving the THSA in response to the pilot trim control signal; and an electronic override system configured to give inputs from the pilot priority over inputs from the FCC by preventing the at least one main THSA motor from driving the THSA when an input from the pilot via the pilot trim control system requires a different state for the THSA than an input from the FCC;

wherein the electronic override system is provided as a part of an electronic control circuit that is configured to give inputs from the pilot priority over inputs from the FCC by preventing the at least one main THSA motor from driving the THSA when an input from the pilot via the pilot trim control system requires a different state for the THSA than an input from the FCC; and wherein the electronic control circuit includes a trim control comparator for comparing a current trim angle of the THSA with a trim angle demanded by the pilot trim control signal, wherein when the pilot input at the trim control results in a difference between demanded trim angle and the actual trim angle then the electronic circuit prevents driving of the THSA by the at least one main THSA motor, whilst the THSA is driven by the trim control motor in accordance with the pilot input.

2. The THSA control system as claimed in claim 1, wherein the THSA trim control motor cannot be controlled by the FCC.

3. The THSA control system as claimed in claim 1, wherein the trim control is arranged to receive an indication of THSA movements driven by input from the FCC and to provide feedback on such THSA movements to the pilot.

4. A THSA control system as claimed in claim 3 wherein the indication of THSA movements is based on the output of a trim feedback sensor at the THSA.

5. The THSA control system as claimed in claim 1, wherein the trim control for receiving the input from the pilot is a mechanical device.

6. A THSA control system as claimed in claim 5, wherein the trim control comprises a trim control wheel and the trim control sensor is for measuring the position of the trim control wheel.

7. The THSA control system as claimed in claim 5, wherein the mechanical device of the trim control is arranged to move to reflect THSA movements driven by input from the FCC.

8. The THSA control system as claimed in claim 7, wherein the trim control includes a trim feedback motor for moving the trim control to reflect THSA movements driven by input from the FCC.

9. An aircraft comprising:
the THSA control system of claim 1.

10. A method for control of a THSA of an aircraft, the method comprising:
driving the THSA when required in response to inputs from a flight control computer (FCC) via at least one main THSA motor;
using a pilot trim control system for manual control of the THSA by a pilot overriding the FCC, wherein the pilot trim control system comprises a trim control for receiving an input from the pilot, the trim control including a trim control sensor for detecting the input from the pilot and providing a pilot trim control signal;
driving the THSA in response to the pilot trim control signal via a THSA trim control motor; and
giving inputs from the pilot priority over inputs from the FCC by using an electronic override system that prevents the at least one main THSA motor from driving the THSA when an input from the pilot via the pilot trim control system requires a different state for the THSA than an input from the FCC;
wherein the electronic override system is provided as a part of an electronic control circuit that is configured to give inputs from the pilot priority over inputs from the FCC by preventing the at least one main THSA motor from driving the THSA when an input from the pilot via the pilot trim control system requires a different state for the THSA than an input from the FCC; and
wherein the electronic control circuit includes a trim control comparator for comparing a current trim angle of the THSA with a trim angle demanded by the pilot trim control signal, wherein when the pilot input at the trim control results in a difference between demanded trim angle and the actual trim angle then the electronic circuit prevents driving of the THSA by the at least one main THSA motor, whilst the THSA is driven by the trim control motor in accordance with the pilot input.

11. A method of modifying an aircraft to replace a pre-existing mechanical THSA control system with the THSA control system that includes: at least one main THSA motor for driving the THSA in response to inputs from a flight control computer (FCC); a pilot trim control system for manual control of the THSA by a pilot overriding the FCC, wherein the pilot trim control system comprises a trim control for receiving an input from the pilot, the trim control including a trim control sensor for detecting the input from the pilot and providing a pilot trim control signal; a THSA trim control motor for driving the THSA in response to the pilot trim control signal; and an electronic override system configured to give inputs from the pilot priority over inputs from the FCC by preventing the at least one main THSA motor from driving the THSA when an input from the pilot via the pilot trim control system requires a different state for the THSA than an input from the FCC, wherein the electronic override system is provided as a part of an electronic control circuit that is configured to give inputs from the pilot priority over inputs from the FCC by preventing the at least one main THSA motor from driving the THSA when an input from the pilot via the pilot trim control system requires a different state for the THSA than an input from the FCC; and wherein the electronic control circuit includes a trim control comparator for comparing a current trim angle of the THSA with a trim angle demanded by the pilot trim control signal, wherein when the pilot input at the trim control results in a difference between demanded trim angle and the actual trim angle then the electronic circuit prevents driving of the THSA by the at least one main THSA motor, whilst the THSA is driven by the trim control motor in accordance with the pilot input, wherein the pre-existing mechanical THSA control system comprises a trim control, a mechanical input for the THSA and control cables coupling the trim control to the mechanical input for the THSA;

wherein the method comprises:
removing and/or disconnecting the control cables; installing the trim control sensor at the trim control; and
replacing the mechanical input for the THSA with the trim control motor.

* * * * *